United States Patent [19]

Olson

[11] Patent Number: 5,230,539
[45] Date of Patent: Jul. 27, 1993

[54] QUICK CONNECT TUBE COUPLING

[75] Inventor: Darwin C. Olson, Franklin, Tenn.

[73] Assignee: Dana Corporation, Toledo, Ohio

[21] Appl. No.: 816,136

[22] Filed: Dec. 31, 1991

[51] Int. Cl.$^5$ .................. F16L 21/06; F16L 33/00; F16L 47/00; F16L 49/00
[52] U.S. Cl. .................................... 285/323; 285/243
[58] Field of Search ............... 285/243, 319, 322, 323

[56] References Cited

U.S. PATENT DOCUMENTS

| | | |
|---|---|---|
| 3,653,689 | 4/1972 | Sapy et al. |
| 3,685,860 | 8/1972 | Schmidt |
| 3,743,326 | 7/1973 | Courtot et al. |
| 3,909,046 | 9/1975 | Legris |
| 3,963,267 | 6/1976 | Legris |
| 3,999,783 | 12/1976 | Legris |
| 4,005,883 | 2/1977 | Guest |
| 4,062,572 | 12/1977 | Davis |
| 4,178,023 | 12/1979 | Guest |
| 4,188,051 | 2/1980 | Burge |
| 4,220,361 | 9/1980 | Brandenberg ............ 285/323 |
| 4,335,908 | 6/1982 | Burge |
| 4,407,526 | 10/1983 | Cicenas ............ 285/323 X |
| 4,431,216 | 2/1984 | Legris |
| 4,445,714 | 5/1984 | Kisiel, III |
| 4,573,716 | 3/1986 | Guest |
| 4,606,783 | 8/1986 | Guest ............ 285/323 X |
| 4,627,644 | 12/1986 | Ekman ............ 285/323 X |
| 4,657,286 | 4/1987 | Guest ............ 285/323 |
| 4,685,706 | 8/1987 | Kowal et al. ............ 285/322 |
| 4,722,560 | 2/1988 | Guest ............ 285/323 |
| 4,804,213 | 2/1989 | Guest ............ 285/322 X |
| 4,946,213 | 8/1990 | Guest ............ 285/323 |

Primary Examiner—Neill R. Wilson
Attorney, Agent, or Firm—MacMillan, Sobanski & Todd

[57] ABSTRACT

A quick connect coupling for connecting a tube to a body having a stepped bore formed therethrough. The coupling includes a sleeve which is press fit in the bore. The inner surface of the sleeve has a cylindrical portion, a radially outwardly extending frusto-conical portion, and an internal shoulder defined therebetween. A collet is disposed within the sleeve having a boss portion which is slightly smaller than the inner diameter of the cylindrical portion of the sleeve. The boss portion supports and guides the collet for co-axial movement relative to the sleeve. The collet further includes an enlarged end portion having an external shoulder and a frusto-conical surface. The frusto-conical collet surface is disposed within the frusto-conical sleeve surface. The tube is inserted within the coupling within the collet. When it is attempted to move the tube out of the body, the frusto-conical collet surface engages the frusto-conical sleeve surface. Also, the external collet shoulder engages the internal sleeve shoulder. As a result, the collet (and the tube engaged thereby) are positively retained within the coupling and the body.

11 Claims, 2 Drawing Sheets

QUICK CONNECT TUBE COUPLING

BACKGROUND OF THE INVENTION

This invention relates in general to couplings for tubes and similar fluid conduits and in particular to an improved structure for a quick connect coupling adapted for use with such tubes.

Flexible tubes or hoses are commonly used as fluid conduits in many different fluid power systems. For example, tubes are commonly used to carry pressurized air in vehicle air brake and air conditioning systems. A coupling is provided to connect the end of such a tube to a body, such a conventional fitting, valve, manifold, or similar device adapted to transmit or receive the pressurized air. Many different coupling structures are known in the art. However, connecting the tube to the body (and subsequently removing it therefrom) can be a time consuming and expensive task. Furthermore, such connection and removal is often performed in the field, where specialized tools may not be readily available.

As a result, a wide variety of push-to-connect type couplings have been developed which permit a tube to be quickly and easily connected to a body without the use of tools. In such couplings, the tube is connected to the body simply by installing the coupling in a bore formed in the body (typically by press fitting the coupling therein), then inserting the leading edge of the tube into the coupling. The coupling typically contains a plurality of components for releasably retaining the tube therein. This type of coupling is advantageous because no tools or other manual operations are required to connect the tube to the coupling.

A typical push-to-connect coupling includes a hollow cylindrical sleeve which is press fit or otherwise retained in a bore formed through the body. The sleeve includes an inner surface having a frusto-conical portion formed thereon. A generally hollow cylindrical collet is disposed within the sleeve. The collet is typically partially split so as to have a plurality of flexible fingers. Each of the fingers is provided with an outer frusto-conical surface which cooperates with the inner frusto-conical surface of the sleeve. Each of the fingers is further provided with one or more radially inwardly extending teeth.

A tube is connected to the body by inserting the leading edge thereof into the coupling. The outer surface of the tube engages the fingers, flexing them radially outwardly toward the corresponding inner frusto-conical surface of the sleeve. If the tube is subsequently attempted to be withdrawn from the body, the outer frusto-conical surface of the collet is drawn into engagement with the inner frusto-conical surface of the sleeve. As a result, the radially inwardly extending teeth of the collet fingers are moved into engagement with the outer surface of the tube, preventing the withdrawal thereof.

Under normal operating conditions, the above-described push-to-connect coupling is satisfactory to retain the tube within the coupling and the body. However, if the axial load on the tube is excessive, such as may result from high fluid pressure within the tube, the tube may undesirably be withdrawn from the coupling. Also, if a radial load is placed on the tube, the collet may be displaced from its preferred co-axial position relative to the tube and the sleeve. Such radial displacement can result in leakage from the coupling. Accordingly, it would be desirable to provide an improved push-to-connect type coupling wherein the tube is positively retained within the body, and wherein leakage of fluid from the coupling is minimized, even when radial loads are placed on the tube.

SUMMARY OF THE INVENTION

This invention relates to an improved structure for a quick connect coupling adapted to connect a tube or similar fluid conduit to a body. The body has a stepped bore formed therethrough, and a relatively rigid tubular insert is disposed within the inner portion of the bore. An annular sleeve is also disposed within the bore of the body. The sleeve is generally hollow and cylindrical in shape and is press fit or otherwise retained in the outer portion of the bore. The inner surface of the sleeve is formed having a radially inwardly extending frusto-conical portion, a generally cylindrical intermediate portion, and a radially outwardly extending frusto-conical portion. An internal shoulder is defined between the intermediate portion and the radially outwardly extending frusto-conical portion. An annular collet is disposed within the sleeve. The collet is generally hollow and cylindrical in shape, including an outer flange portion which is located outside of the sleeve and the body. The collet also includes an intermediate boss portion disposed within the sleeve. The outer diameter of the intermediate boss portion is slightly smaller than the inner diameter of the sleeve so as to support and guide the collet for movement relative to the sleeve. The collet further includes an enlarged end portion. The outer surface of the enlarged end portion is formed having an external shoulder and a radially outwardly extending frusto-conical surface. The frusto-conical surface is disposed within the radially outwardly extending frusto-conical inner surface of the sleeve. When it is attempted to move the tube out of the body, the frusto-conical outer surface of the enlarged end portion engages the frusto-conical inner surface of the sleeve. Also, the shoulder formed on the enlarged end portion of the collet engages the shoulder formed on the sleeve. As a result, the collet (and the tube engaged thereby) are positively retained within the coupling and the body.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
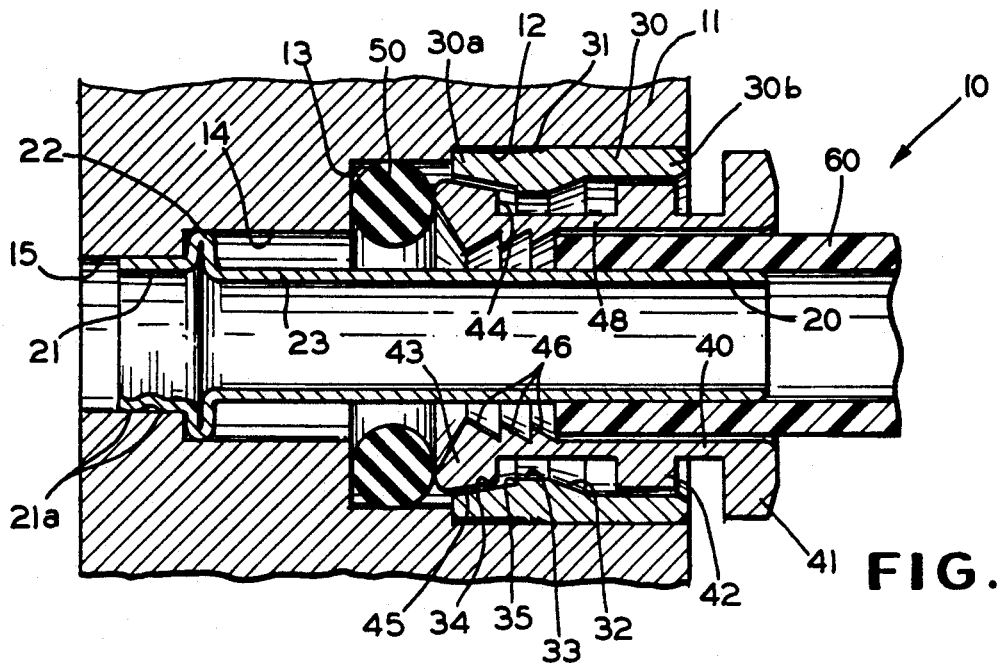
FIG. 1 is a partial cross sectional view illustrating a first embodiment of a push-to-connect coupling in accordance with this invention, a leading end of a tube being shown partially inserted therein.

Referring now to the drawings, there is illustrated in FIG. 1 a portion of a quick connect coupling, indicated generally at 10, in accordance with this invention. The coupling 10 includes a body 11, which may be a conventional fitting, valve, manifold, or similar device. The body 11 has a bore formed therethrough which is defined by first, second, third, and fourth concentric stepped bore portions 12, 13, 14, and 15. The bore portions 12, 13, 14, and 15 are formed having inner diameters which are successively smaller in size so as to define respective shoulders therebetween. The body 11 is preferably formed from a metallic material, such as brass or aluminum. However, the body 11 may be formed from a plastic material, such as reinforced nylon.

A relatively rigid tubular insert 20 is disposed within the bore of the body 11. The insert 20 is generally hollow and cylindrical in shape, having a first end portion 21, an intermediate portion 22, and a second end portion 23. The first end portion 21 is formed having an outer diameter which is slightly less than the inner diameter of the fourth stepped bore portion 15. A plurality of radially outwardly extending projections 21a are formed on the outer surface of the first end portion 21 of the insert 20. These projections 21a are provided to frictionally engage the inner surface of the fourth stepped portion 15 so as to retain the insert 20 within the bore formed through the body 11. The projections 21a also accommodate for variations in the inner diameter of the fourth stepped bore portion 15.

The intermediate portion 22 of the insert 20 is defined by a folded region of the insert 20 which extends radially outwardly, then radially inwardly. The outer diameter of the intermediate portion 22 is slightly smaller than the inner diameter of the third stepped bore portion 14. The second end portion 23 of the insert 20 is formed having an outer diameter which is less than the inner diameters of the first and second stepped bore portions 12 and 13, respectively. The outermost end of the second end portion 23 may extend axially beyond the body 11 as illustrated, although this is not required. Preferably, the insert 20 is formed from a metallic material, such as brass or stainless steel. However, the insert 20 may also be formed from a plastic material, such as reinforced nylon. If both the insert 20 and the body 11 are formed from a reinforced nylon material, they may be secured together within the fourth stepped bore portion 15 by a conventional spin-welding process.

An annular sleeve 30 is also disposed within the bore of the body 11. The sleeve 30 is generally hollow and cylindrical in shape, having a first end portion 30a and a second end portion 30b. The first end portion 30a of the sleeve 30 is formed having an outer diameter which is slightly smaller than the inner diameter of the first stepped bore portion 12. The second end portion 30b of the sleeve 30 is formed having an outer diameter which is slightly larger than the inner diameter of the first stepped bore portion 12. This difference in outer diameters facilitates the proper installation of the sleeve 30 into the first stepped bore portion 12 because only the first end portion 30a can be inserted within the bore by hand. Between the first and second end portions 30a and 30b, a plurality of annular serrations or teeth 31 are formed about the outer periphery of the sleeve 30. The enlarged diameter second end portion 30b and the teeth 31 provide a press-fit frictional engagement of the sleeve 30 within the first stepped bore portion 12 to secure the sleeve 30 to the body 11.

The inner surface of the sleeve 30 is formed having a radially inwardly extending frusto-conical portion 32, a generally cylindrical intermediate portion 33, and a radially outwardly extending frusto-conical portion 34. An internal shoulder 35 is defined between the intermediate portion 33 and the radially outwardly extending frusto-conical portion 34. Preferably, the sleeve 30 is formed from a metallic material, such as brass. However, the sleeve 30 may also be formed from a plastic material, such as reinforced nylon. If both the sleeve 30 and the body 11 are formed from a reinforced nylon material, they may be secured together within the first stepped bore portion 12 by a conventional spin-welding process.

Figure 3:
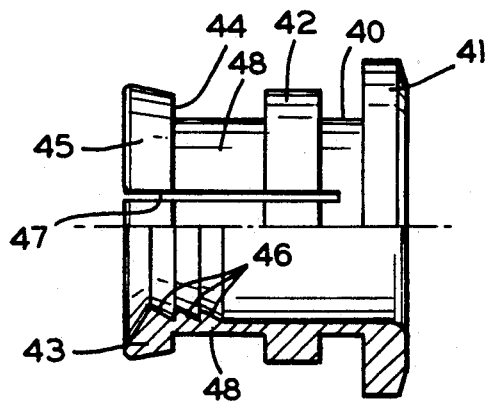
FIG. 3 is a cross sectional view, partially broken away, of the collet of the coupling shown in FIGS. 1 and 2.

An annular collet 40 is disposed within the sleeve 30. As best shown in FIG. 3, the collet 40 is generally hollow and cylindrical in shape, including an outer flange portion 41 which is located outside of the sleeve 30 and the body 11. The outer flange portion 41 is provided to easily permit the collet 40 to be moved axially relative to the sleeve 30, as will be described in detail below. The collet 40 also includes an intermediate boss portion 42 disposed within the sleeve 30. The outer diameter of the intermediate boss portion 42 is slightly smaller than the inner diameter of the sleeve 30 so as to support and guide the collet 40 for movement relative to the sleeve 30, also as described below.

The collet 40 further includes an enlarged end portion 43. The outer surface of the enlarged end portion 43 is formed having an external shoulder 44 and a radially outwardly extending frusto-conical surface 45. The frusto-conical surface 45 is disposed within the radially outwardly extending frusto-conical inner surface 34 of the sleeve 30. The inner surface of the enlarged end portion 43 is formed having a plurality of annular serrations or teeth 46. The purpose of these teeth 46 will be explained in detail below. The collet 40 is preferably formed from a metallic material, such as brass. However, the collet 40 may also be formed from a plastic material, such as reinforced nylon.

A plurality of axially extending slots 47 are formed in the inner end of the collet 40, extending through the enlarged end portion 43 and the boss portion 42. The slots 47 are preferably spaced equidistantly about the Collet 40 so as to define a corresponding number of collet fingers 48. Preferably, eight of such slots 47 are formed in the collet 40 to provide eight collet fingers 48. Each of the collet fingers 48 is capable of being flexed radially inwardly and outwardly, for a purpose which will be described below.

A conventional O-ring 50 is disposed within the second stepped bore portion 13 of the bore formed through the body 11. The O-ring 50 is formed from an elastomeric material and is adapted to form a fluid-tight seal within the coupling 10, as will be described below.

Initially, the coupling 10 is assembled and secured to the body 10 for use. To accomplish this, the insert 20 is first inserted axially within the bore formed through the body 11. The axial movement of the insert 20 continues until the intermediate portion 22 thereof engages the shoulder defined between the third and fourth stepped bore portions 14 and 15, respectively. Then, the O-ring 50 is inserted axially within the bore formed through the body 11 and about the insert 20. The O-ring 50 is positioned so as to be disposed adjacent to the shoulder defined between the second and third stepped bore portions 13 and 14, respectively.

Next, the sleeve 30 is inserted axially within the bore formed through the body 11 until the leading edge thereof engages the shoulder defined between the first and second stepped bore portions 12 and 13, respectively. Lastly, the collet 40 is then inserted axially within the sleeve 30 until the leading edge thereof abuts the O-ring 50. Alternatively, the collet may be inserted axially within the sleeve 30 as a sub-assembly, which is then inserted within the bore until the leading edge of the sleeve 30 engages the shoulder defined between the first and second stepped bore portions 12 and 13, respectively.

Figure 2:
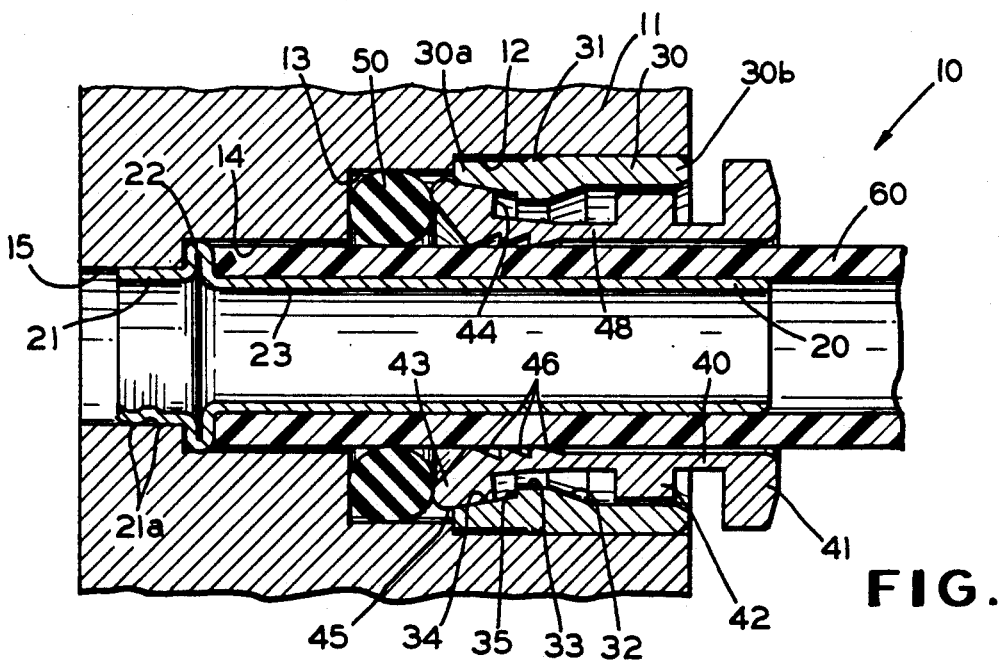
FIG. 2 is a view similar to FIG. 1 showing the tube completely inserted within the coupling.

Once the coupling 10 has been assembled in this manner, it can be used to releasably connect a hollow cylindrical member, such as a flexible nylon tube 60, to the body 11. To accomplish this, the leading edge of the tube 60 is inserted axially within the collet 40 and about the insert 20, as shown in FIG. 1. As the tube 60 is further moved axially, the outer surface thereof engages the teeth 46 formed on the inner surface of the collet 40. This engagement causes the collet fingers 48 to be spread radially outwardly, apart from one another. At the same time, the frusto-conical outer surface 45 of the enlarged end portion 43 engages the frusto-conical inner surface 34 of the sleeve 30. Axial movement of the tube 60 continues such that the leading edge thereof is pushed through the O-ring 50 and is moved into engagement with the intermediate portion 22 of the insert 20, as shown in FIG. 2. Such engagement prevents further axial movement of the tube 60. This is the normal operating position of the tube 60 relative to the coupling 10 and the body 11. The O-ring 50 provides a fluid-tight seal between the outer surface of the tube 60 and the inner surface of the second stepped bore portion 13 of the body 11. In this position, the teeth 46 of the collet 40 exert only a relatively light gripping force on the outer surface of the tube 60.

Once the tube 60 has been inserted within the body 11 in this manner, it cannot be removed therefrom by merely moving it in the opposite axial direction. If such movement is attempted, the engagement of the teeth 46 of the collet 40 causes the collet 40 to be moved axially with the tube 60. Such axial movement of the collet 40 causes the frusto-conical outer surface 45 of the enlarged end portion 43 to engage the frusto-conical inner surface 34 of the sleeve 30. As a result, the teeth 46 of the collet 40 are pressed radially inwardly into secure gripping engagement with the outer surface of the tube 60. Further axial movement of the tube 60 is also prevented by the engagement of the shoulder 44 formed on the enlarged end portion 43 of the collet with the shoulder 35 formed on the sleeve 30. As a result, the collet 40 (and the tube 60 engaged thereby) are positively retained within the coupling 10 and the body 11.

As mentioned above, the outer diameter of the intermediate boss portion 42 of the collet 40 is only slightly smaller than the inner diameter of the sleeve 30. As a result, the collet 40 is supported within the sleeve 30 against radial displacement. Such radial displacement is undesirable because it may cause the fluid-tight seal created by the engagement of the O-ring 50 with the outer surface of the tube 60 and the inner surface of the second stepped bore portion 13 of the body 11 to be disrupted.

When it is desired to remove the tube 60 from the coupling 10, the outer flange portion 41 of the collet 40 is urged axially inwardly within the body 11 relative to the sleeve 30. Such axial movement of the collet 40 causes the frusto-conical outer surface 45 of the enlarged end portion 43 to be moved out of engagement with the frusto-conical inner surface 34 of the sleeve 30. As a result, the teeth 46 of the collet 40 can be flexed radially outwardly out of gripping engagement with the outer surface of the tube 60. While the collet 40 is maintained in this position, the tube 60 can be moved axially out of the coupling 10 and the body 11. If desired, the collet 40 may be formed without the outer flange portion 41. This may be desirable in situations where easy removal of the tube 60 from the coupling 10 is not preferred. Without the outer flange portion 41, a special tool may be required to move the collet 40 as described above to release the tube 60 from the coupling 10.

Figure 4:
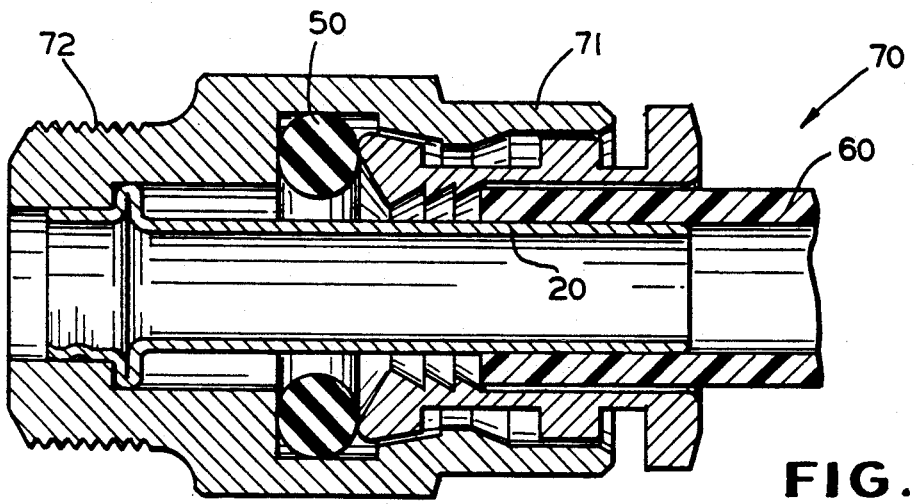
FIG. 4 is a partial cross sectional view similar to FIG. 1 of a second embodiment of a push-to-connect coupling in accordance with this invention.

FIG. 4 illustrates a second embodiment of a coupling 70 in accordance with this invention. The coupling 70 is similar to the coupling 10 described above, except that the body 11 and the sleeve 30 of the coupling 10 are formed integrally as a unitary body 71. Otherwise, the coupling 70 functions in the same manner as the coupling 10 described above. In addition, the unitary body 71 can be embodied as a fitting having a threaded end portion 72 for securing it to a correspondingly threaded member (not shown).

Figure 5:
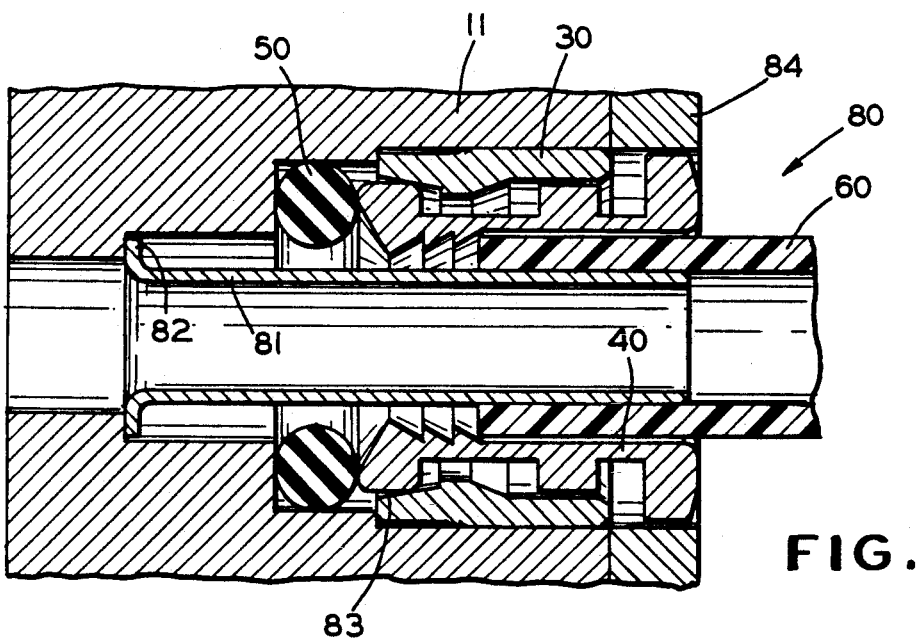
FIG. 5 is a partial cross sectional view similar to FIG. 1 of a third embodiment of a push-to-connect coupling in accordance with this invention.

FIG. 5 illustrates a third embodiment of a coupling 80 in accordance with this invention. The coupling 80 is similar to the coupling 10 described above, except that the insert 20 is formed as an insert 81 having a radially outwardly flared end portion 82. The flared end portion 82 is frictionally retained within the third stepped bore portion 14 of the bore formed through the body 11. In this embodiment, the outer frusto-conical surface 45 of the enlarged end portion 43 of the collet 40 is replaced by a generally axially extending surface 83. Lastly, an extension 84 is secured to the outer surface of the body 11 to restrict access to the outer flange portion 41 of the collet 40. As a result, a special tool is required to withdraw the tube 60 from the coupling 10.

Figure 6:
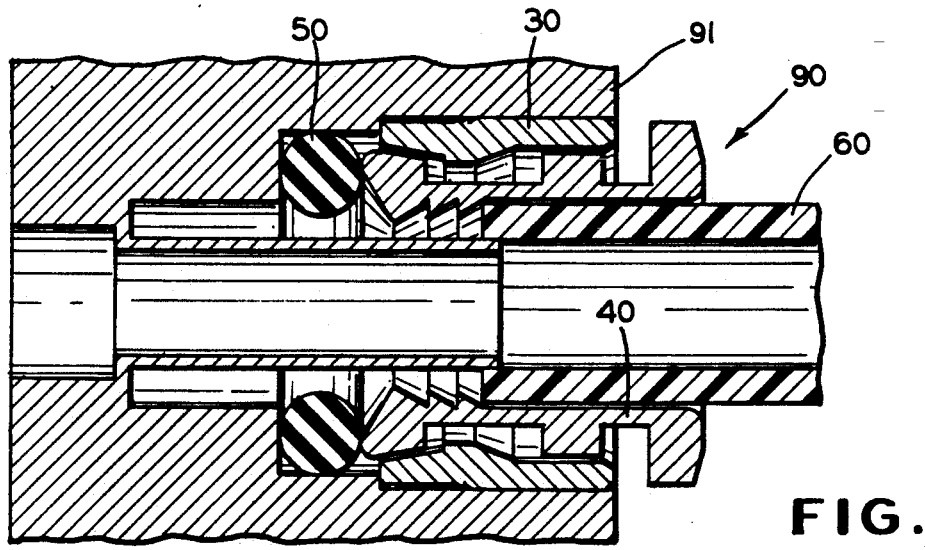
FIG. 6 is a partial cross sectional view similar to FIG. 1 of a fourth embodiment of a push-to-connect coupling in accordance with this invention.

FIG. 6 illustrates a fourth embodiment of a coupling 90 in accordance with this invention. The coupling 70 is similar to the coupling 10 described above, except that the body 11 and the insert 20 of the coupling 10 are formed integrally as a unitary body 91. Otherwise, the coupling 90 functions in the same manner as the coupling 10 described above.

In accordance with the provisions of the patent statutes, the principle and mode of operation of this invention have been described and illustrated in its preferred embodiments. However, it must be understood that the invention may be practiced otherwise than as specifically explained and illustrated without departing from its spirit or scope.

What is claimed is:

1. A coupling for connecting a body to a tube comprising:
   a bore formed in the body;
   a sleeve provided within said bore and immovable relative thereto, said sleeve including a first frusto-conical surface defining a radially outer end and a radially inner end, a second frusto-conical surface defining a radially inner end and a radially outer end, and a radially extending shoulder defined between the inner ends of said first and second frusto-conical surfaces;
   a collet disposed within said sleeve and including a plurality of fingers, each of said fingers including an enlarged end portion defined by a radially outwardly extending shoulder and a frusto-conical surface extending from a radially inner end at said shoulder to a radially outer end, said collet shoulders cooperating with said sleeve shoulder to retain said collet within said bore when said collet is attempted to be moved axially out from said bore; and means for connecting said collet to the tube to connect the tube to the body.

2. The invention defined in claim 1 wherein said sleeve is formed integrally as a unitary body with the body and defines a portion of said bore.

3. The invention defined in claim 1 wherein said sleeve is frictionally retained within said bore.

4. The invention defined in claim 1 wherein said sleeve further includes a generally cylindrical surface extending between said first and second frusto-conical surfaces.

5. The invention defined in claim 4 wherein said generally cylindrical surface extends from a first end at said radially inner end of said first frusto-conical surface to a second end at said radially extending shoulder.

6. The invention defined in claim 1 further including means for maintaining said collet in a generally co-axial position relative to said bore.

7. The invention defined in claim 6 wherein said means for maintaining includes an enlarged boss formed on said collet, said boss being sized to engage said bore to maintain said collet in a predetermined position relative thereto.

8. The invention defined in claim 1 further including means for preventing the tube from collapsing when inserted within said sleeve and said collet.

9. The invention defined in claim 8 wherein said means for preventing the tube from collapsing includes a hollow cylindrical insert disposed within said bore and adapted to extend within the tube when the tube is inserted within said sleeve and said collet.

10. The invention defined in claim 9 wherein said insert is formed integrally as a unitary body with the body and extends within said bore.

11. The invention defined in claim 9 wherein said insert is frictionally retained within said bore.

* * * * *